(12) United States Patent
Mao et al.

(10) Patent No.: US 11,652,245 B2
(45) Date of Patent: May 16, 2023

(54) BATTERY COOLING ASSEMBLY

(71) Applicant: CONTEMPORARY AMPEREX TECHNOLOGY CO., LIMITED, Ningde (CN)

(72) Inventors: Kaiyuan Mao, Ningde (CN); Xiaoteng Huang, Ningde (CN); Yanlong Gu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 366 days.

(21) Appl. No.: 16/568,963

(22) Filed: Sep. 12, 2019

(65) Prior Publication Data

US 2020/0028222 A1    Jan. 23, 2020

Related U.S. Application Data

(63) Continuation of application No. PCT/CN2019/090514, filed on Jun. 10, 2019.

(30) Foreign Application Priority Data

Jul. 17, 2018  (CN) .......................... 201821135180.4

(51) Int. Cl.
*H01M 10/613*  (2014.01)
*H01M 10/04*  (2006.01)

(52) U.S. Cl.
CPC ......... *H01M 10/613* (2015.04); *H01M 10/04* (2013.01)

(58) Field of Classification Search
CPC .............. H01M 10/613; H01M 10/04; H01M 10/6556; Y02E 60/10; Y02P 70/50; F28F 9/18; F28F 9/04; F28F 9/182; F28F 9/02
See application file for complete search history.

(56) References Cited

U.S. PATENT DOCUMENTS

2014/0050952 A1*  2/2014  Merriman ................. F28F 1/00
                                               429/72
2017/0373361 A1* 12/2017  Kosaki ............... H01M 10/613

FOREIGN PATENT DOCUMENTS

CN    104756279 A    7/2015
CN    205104538 U    3/2016
(Continued)

OTHER PUBLICATIONS

English translation of CN205646066.*
(Continued)

*Primary Examiner* — Kiran Quraishi Akhtar
(74) *Attorney, Agent, or Firm* — Anova Law Group, PLLC

(57) ABSTRACT

Some embodiments of the present disclosure relate to technical field of the battery cooling technical and provide a battery cooling assembly, including: a cooling tube; a collecting tube, provided with at least one collecting opening; a connecting aid, including a base plate provided with a through hole, and a hole wall of the through hole extends outwardly to form an extension. An end of the cooling tube is connected to the extension through the through hole, the base plate is connected with the collecting tube, and the through hole being in communication with the collecting opening. The battery cooling assembly of the present disclosure can increase the connection strength between the cooling tube and the collecting tube, thereby reducing a risk of leakage of a cooling medium.

13 Claims, 6 Drawing Sheets

(56) References Cited

FOREIGN PATENT DOCUMENTS

| CN | 205646066 | * | 10/2016 | .......... H01M 10/613 |
| CN | 205646066 U | | 10/2016 | |
| CN | 107546347 A | | 1/2018 | |
| CN | 108428966 A | | 8/2018 | |
| CN | 208368689 U | | 1/2019 | |
| DE | 19524052 | * | 1/1997 | ................ F28F 9/02 |
| DE | 19524052 A1 | | 1/1997 | |
| DE | 102015115609 A1 | | 3/2017 | |
| DE | 102017210344 A1 | | 12/2017 | |
| EP | 0453738 | * | 10/1991 | .............. F28F 9/182 |
| EP | 0453738 A1 | | 10/1991 | |
| FR | 2770632 | * | 5/1999 | ............... F28D 1/03 |
| WO | 2008025617 A1 | | 3/2008 | |
| WO | 2018206895 A1 | | 11/2018 | |

OTHER PUBLICATIONS

English translation of DE19524052.*
English translation of FR 2770632.*
English translation of EP0453738.*
International Search Report (and English translation) and Written Opinion of the International Searching Authority for International Application No. PCT/CN2019/090514 dated Sep. 17, 2019.
Extended European Search Report for European Patent Application No. 19762694.8 dated Mar. 27, 2020.
The European Patent Office (EPO) Decision to Grant a European Patent Pursuant to Article 97(1) EPC for 19762694.8 dated Mar. 24, 2022 1 Pages.
Patent Cooperation Treaty(PCT) Written Opinion of the International Searching Authority for PCT/CN2019/090514 dated Sep. 17, 2019 5 pages.

* cited by examiner

BATTERY COOLING ASSEMBLY

CROSS REFERENCE TO RELATED APPLICATIONS

The present disclosure is a continuation of International Application No. PCT/CN2019/090514, filed on Jun. 10, 2019, which claims the priority benefit of Chinese Patent Application No. 201821135180.4, filed on Jul. 17, 2018 and titled "Battery Cooling Assembly", the disclosures of each of which are hereby incorporated by reference herein in their entirety.

TECHNICAL FIELD

The present disclosure relates to the technical field of battery cooling technology, more particular to a battery cooling assembly.

BACKGROUND

Liquid-cooled plates are widely used in the cooling systems of the power battery packs of new-energy vehicles, which have advantages of lightweight, safety and reliability.

SUMMARY

Some embodiments of the present disclosure provides a battery cooling assembly, including:
a cooling tube;
a collecting tube, provided with at least one collecting opening; and
an connecting aid, including a base plate provided with a through hole, and a hole wall of the through hole extends outward to form an extension;
where an end of the cooling tube is connected to the extension through the through hole, the base plate is connected with the collecting tube, and the through hole in communication with the collecting opening.

In some embodiments, the extension extends one-way along an axis of the through hole.

In some embodiments, the extension extends into the collecting opening.

In some embodiments, the extension is of a tube structure.

In some embodiments, a cross-sectional shape of the extension matches a shape of the collecting opening, and the extension extends through the collecting opening into the collecting passage of the collecting tube.

In some embodiments, an opening edge of the collecting opening consists of a top edge, a bottom edge and two side edges; the hole wall of the through hole consists of a top hole wall, a bottom hole wall and two side hole walls; the extension is formed through extension of the bottom wall, and the extension abuts against the bottom edge of the collecting opening.

In some embodiments, the collecting tube consists of a top wall, a bottom wall and two side walls; the collecting opening is provided in one of the side walls, and a distance between the top edge of the collecting opening and the top wall is greater than a distance between the bottom edge of the collecting opening and the bottom wall.

In some embodiments, the bottom edge of the collecting opening is aligned with an inner surface of the bottom wall.

In some embodiments, the base plate includes a first surface and a second surface, the extension is formed on the second surface, and a chamfer is provided at the through hole of the first surface.

In some embodiments, the extension is formed when the through hole is punched on the base plate by a stamping process.

As compared with the existing technology, in the battery cooling assembly of the present disclosure, the connecting aid is disposed at a junction of the collecting opening of the collecting tube and the cooling tube, such that an end of the cooling tube is connected to the extension through the through hole, and the base plate is connected with the collecting tube. In this way, a connection area between the cooling tube and the collecting tube is increased, and the connection strength between them is improved, thereby ensuring tightness of the connection and reducing a risk of leakage of the cooling medium.

Figure 1A:
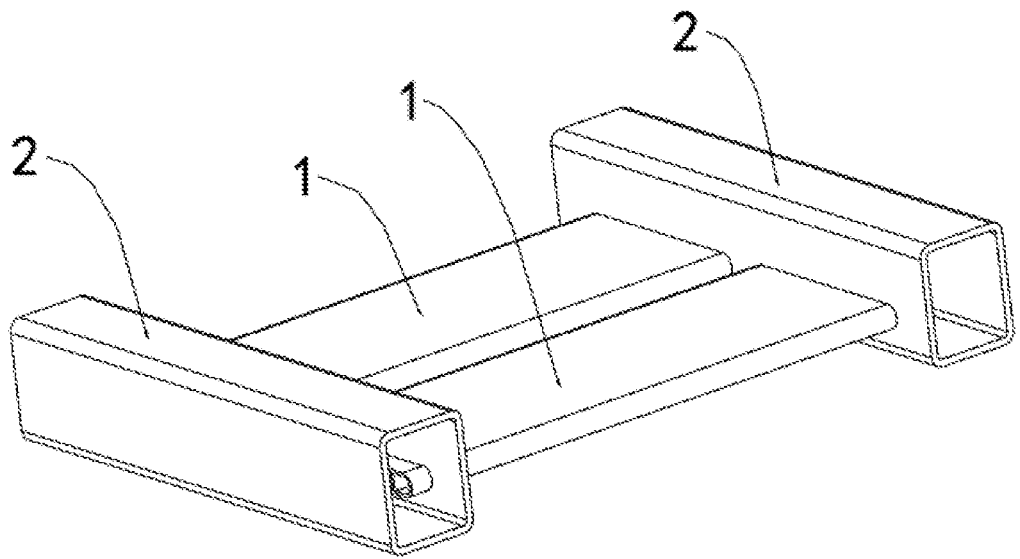
FIG. 1A shows a perspective view of a water-cooled plate in the existing technology.

LIST OF REFERENCE SIGNS IN DRAWINGS 1 cooling tube
2 collecting tube
21 top wall
22 bottom wall
23 side wall
24 collecting opening
3 connecting aid
31 base plate
311 first surface
312 second surface
32 through hole
33 extension
331 outer peripheral wall
3311 top surface
3312 bottom surface
3313 side curved surface
332 inner peripheral wall
34 chamfer
241 top edge
242 bottom edge
243 side edge 321 top hole wall
322 bottom hole wall
323 side hole wall
100 battery cooling assembly

DETAILED DESCRIPTION

The technical content, structural features, objectives and effects of the technical solutions of the present disclosure will be described in detail below with reference to the accompanying drawings.

Figure 1B:
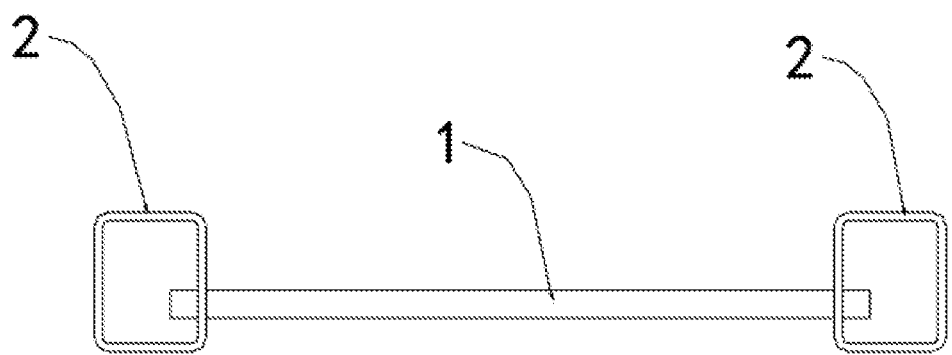
FIG. 1B shows a front view of the water-cooled plate as shown in FIG. 1A.

The inventor finds that as shown in FIG. 1A and FIG. 1B, an existing liquid-cooled plate is formed by soldering a cooling tube 1 and a collecting tube 2. The collecting tube 2 is generally a square tube or a circular tube, and the collecting tube 2 is provided with a soldering hole having a size of a tube aperture of the cooling tube, and the soldering hole is processed by machining. When the cooling tube 1 is soldered to the collecting tube 2, there is a disadvantageous that the soldering area is too small and the soldering is unstableness, which may easily cause insufficient mechanical strength of the soldered portion, thereby causing an increase in the risk of leakage of the liquid-cooled plate after experiencing vibration.

Based on this, as shown in FIG. 2A, FIG. 2B, FIG. 2C and FIG. 2D, an embodiment of the present disclosure provides a battery cooling assembly 100, including the following components.

A cooling tube 1 having a cooling medium inside, the cooling medium may be either a liquid or a gas; the cooling tube 1 generally disposed in a battery system to remove heat of the battery, thereby achieving cooling the battery system.

A collecting tube 2, provided with a collecting opening 24; where a collecting passage of the collecting tube 2 has functions of distributing and collecting the cooling medium. For example, two collecting tubes 2 can connect a plurality of cooling tubes 1 in parallel, where one of the collecting tubes 2 distributes the cooling medium to all the cooling tubes 1, and the cooling medium in all the cooling tubes 1 is collected into the other collecting tube 2.

Figure 2A:
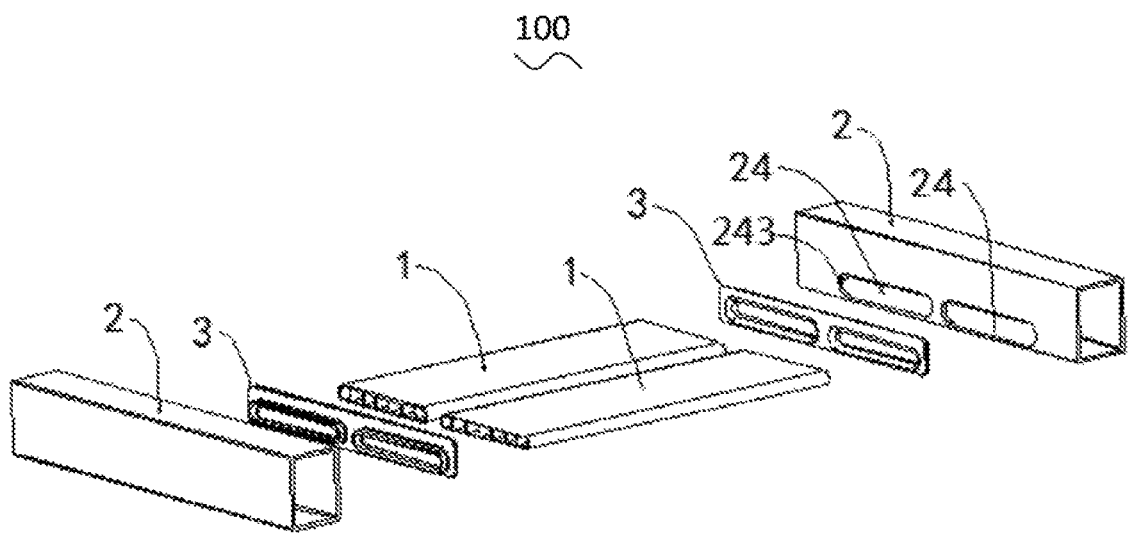
FIG. 2A shows an exploded view of a battery cooling assembly in accordance with an embodiment of the present disclosure.
Figure 2B:
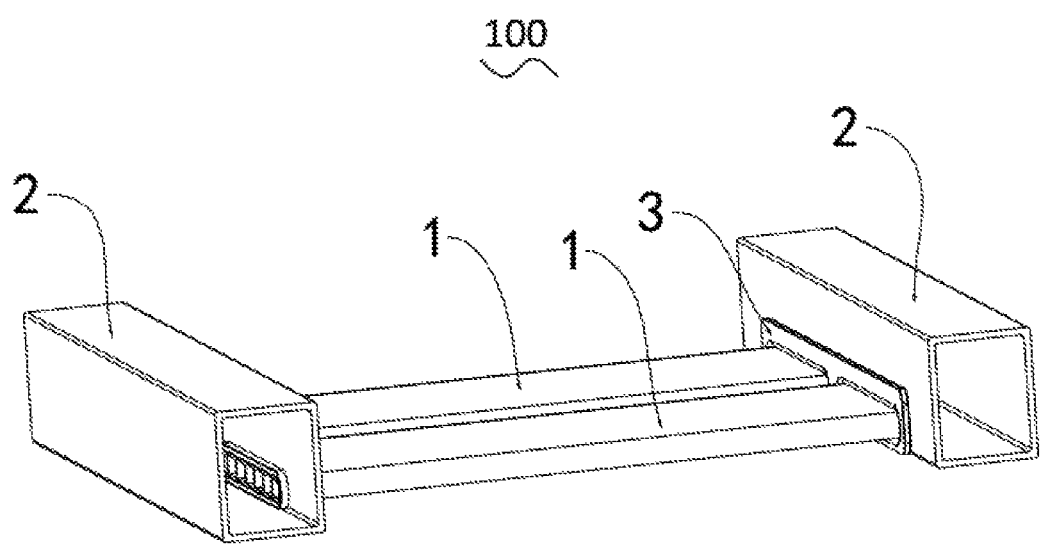
FIG. 2B shows a perspective view of the battery cooling assembly as shown in FIG. 2A.
Figure 2C:
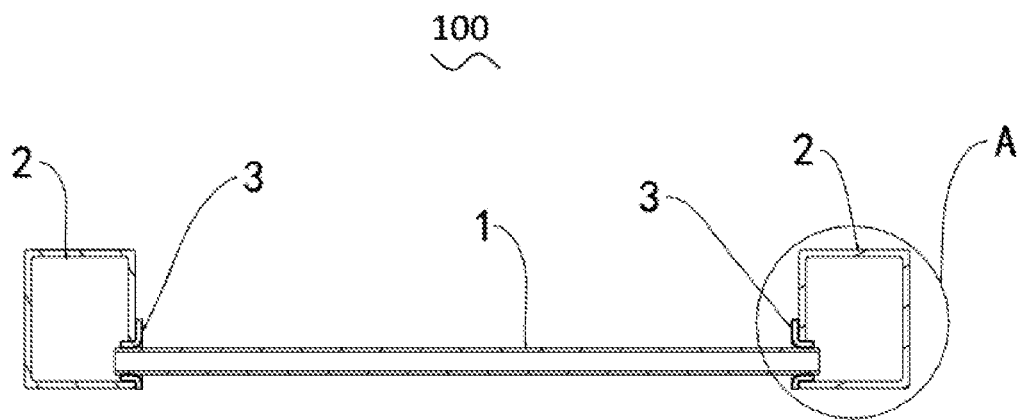
FIG. 2C shows a cross-sectional view of the battery cooling assembly as shown in FIG. 2A.
Figure 2D:
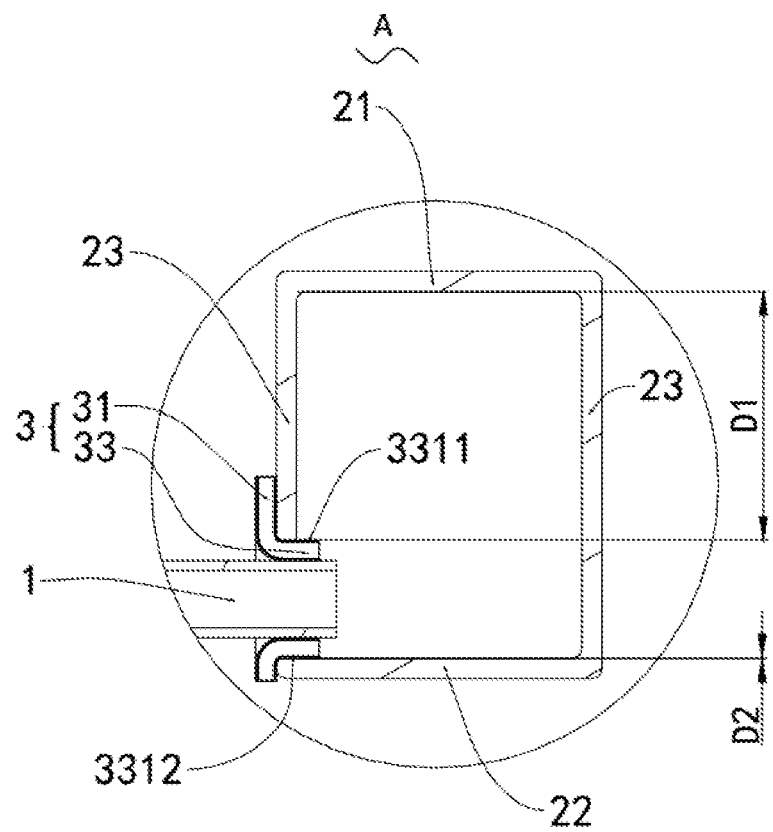
FIG. 2D shows an enlarged view of part A in FIG. 2C.
Figure 3A:
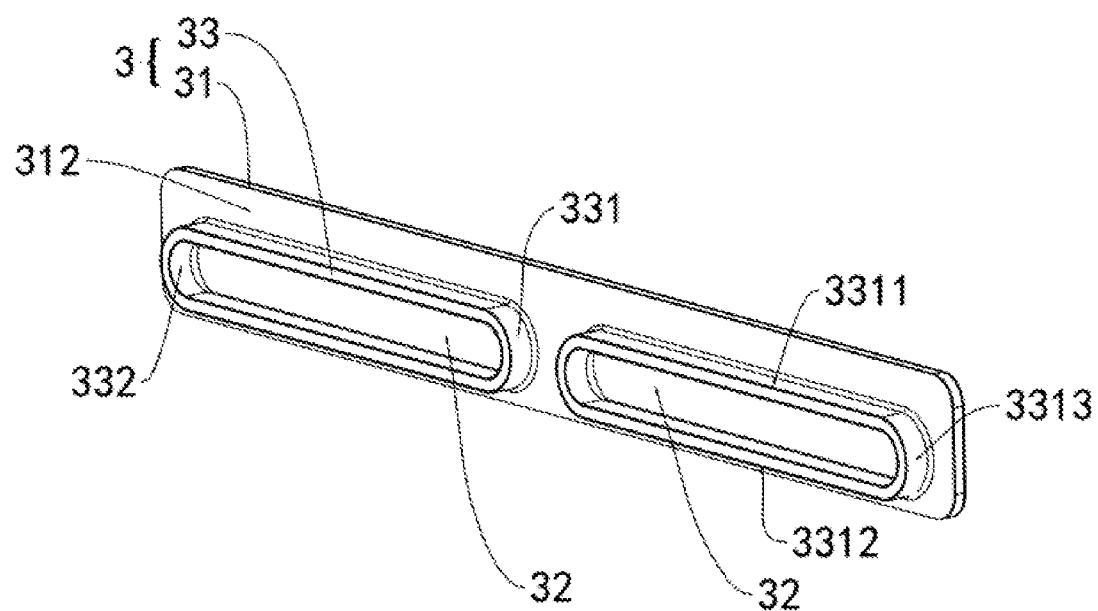
FIG. 3A shows a first perspective view of a connecting aid.

Referring specifically to FIG. 2D and FIG. 3A, a connecting aid 3 includes a base plate 31 provided with a through hole 32, a hole wall of the through hole 32 extending outwardly to form an extension 33.

An end of the cooling tube 1 is connected to the extension 33 through the through hole 32, the base plate 31 is connected with the collecting tube 2, and the through hole 32 communicates with the collecting opening 24. In the battery cooling assembly 100, the connecting aid 3 is disposed at a junction the collecting opening 24 of the collecting tube 2 and the cooling tube 1. In other words, an end of the cooling tube 1 is connected to the extension 33 through the through hole 32, the base plate 31 is connected with the collecting tube 2, and the through hole 32 communicates with the collecting opening 24. The extension 33 makes connection between the end of the cooling tube 1 and the through hole 32 more stronger. The base plate 31 makes connection between the connecting aid 3 and the collecting tube 2 more secure. In this way, the connection area between the cooling tube 1 and the collecting tube 2 is increased and the connection strength between the two is increased, thereby ensuring tightness of the connection and reducing a risk of leakage of the cooling medium.

A cross-sectional shape of the cooling tube 1 may be a rectangle, a circle, a triangle or an elongated strip or the like.

The cooling tube 1 may be a harmonica tube having a plurality of cooling passages parallel to each other, so that the cooling medium is branched into each cooling channel to improve cooling efficiency.

Since there is a risk of leakage in a collecting tube 2 formed by soldering metal plates, the collecting tube 2 may be produced by the extrusion molding process. In this way, there would be no soldered seam in the collecting tube 2, thereby further reducing the risk of leakage of the cooling medium in the collecting tube 2.

Referring to FIG. 2A, FIG. 2C and FIG. 2D, the collecting tube 2 has a square structure and consists of a top wall 21, a bottom wall 22 and two side walls 23, and the collecting opening 24 is provided in one of the side walls 23.

The extension 33 of the connecting aid 3 may extend bidirectionally along the axis of the through hole 32, so that the extension 33 protrudes from two surfaces of the base plate 31, that is, the extension 33 extends through the entire base plate 31 (not shown in the drawings); and the extension 33 may otherwise extend unidirectionally along the axis of the through hole 32, so that the extension 33 protrudes from one surface of the base plate 31, that is, the extension 33 is formed on one surface of the base plate 31 (refer to FIG. 3A). If the extension 33 of the connecting aid 3 extends unidirectionally, the structure and production thereof are more simplified. The extension 33 may be formed by partial hole wall of the through hole 32 extending outwardly. For example, the through hole 32 has a cylinder shape, and a quarter of the hole wall of the through hole 32 extends outwardly to form the extension 33. Accordingly, the extension 33 has an arc panel structure. For another example, the through hole 32 has a rectangular shape and consists of a top hole wall 321, a bottom hole wall 322 and two side hole walls 323, the extension 33 is formed through extension of the one side hole wall 323 of the through hole 32. Accordingly, the extension 33 has a flat plate structure. The extension 33 may otherwise be formed by all hole walls of the through hole 32 extending outwardly, and then the extension 33 has a tubular structure (refer to FIG. 3A), and the end of the cooling tube 1 is connected to the inner peripheral wall 432 of the extension 33, thereby increasing connection area between the end of the cooling tube 1 and the connecting aid 3. In addition, the extension 33 and the base plate 31 may be formed integrally through a concave-convex mold or through a punching process, or may be connected by being fixed through soldering. When an connecting aid 3 is being produced through the punching process, the extension 33 is formed by punching the through hole 32 in the base plate 31 by the punching process.

Figure 3B:
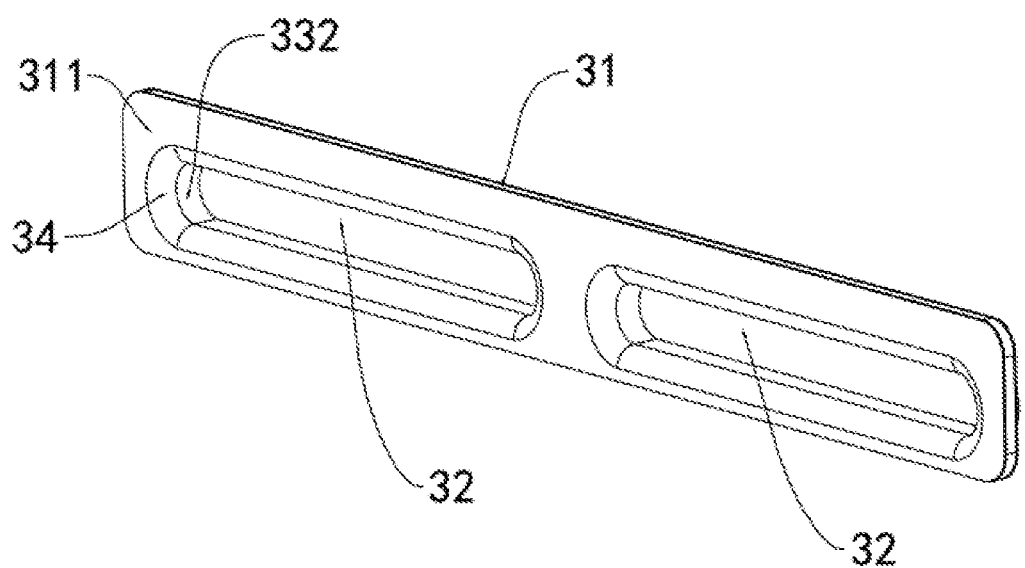
FIG. 3B shows a second perspective view of a connecting aid.

One or more through holes 32 may be provided in the base plate 31. For example, as shown in FIG. 3A and FIG. 3B, each base plate 31 is provided with two through holes 32, and each connecting aid 3 may be fixed to a pair of cooling tubes 1. If a plurality of cooling tubes 1 is needed to be connected to the collecting tube 2 in parallel, a plurality of connecting aids 3 may be used consecutively so as to connect to a plurality of pairs of cooling tubes 1.

Figure 3C:
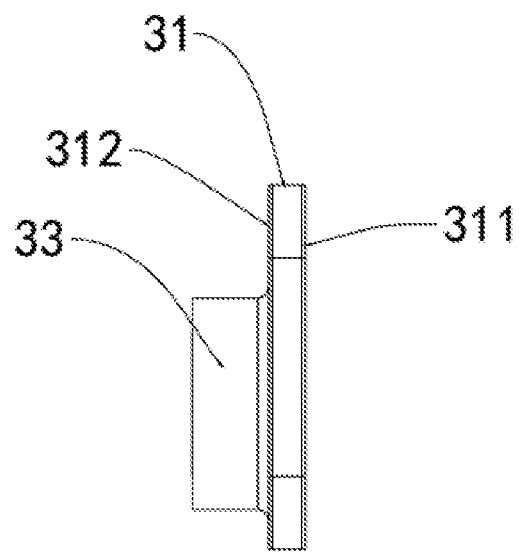
FIG. 3C shows a side view of the connecting aid as shown in FIG. 3A.

As shown in FIG. 3A, FIG. 3B and FIG. 3C, as a second embodiment of the connecting aid 3, the base plate 31 has two surfaces that are respectively a first surface 311 and a second surface 312, the extension 33 is formed on the second surface 312, and a chamfer 34 is provided at the through hole 32 of the first surface 311, which facilitates inserting the port of the cooling tube 1 into the through hole 32.

When the connecting aid 3 and the collecting tube 2 are fixed to each other, the extension 33 of the connecting aid 3 may be formed by extending away from the collecting opening 24, and at this time the extension 33 is not inserted in the collecting opening 24. The extension 33 may otherwise be inserted into the collecting opening 24 (refer to FIG. 2D), in this way, the connection between the connecting aid 3 and the collecting tube 2 is more stable.

As shown in FIG. 2A and FIG. 3A, as a first connection way between the extension 33 of the connecting aid 3 and the collecting opening 24 of the collecting tube 2, a cross-sectional shape of the extension 33 matches the shape of the collecting opening 24, and the extension 33 extends into the collecting passage of the collecting tube 2 via the collecting opening 24. In this way, the connection between the connecting aid 3 and the collecting tube 2 is more stable. For example, the cross-sectional shape of the extension 33 and the collecting opening 24 are both elongated strip. An outer peripheral wall 331 of the extension 33 consists of a top surface 3311, a bottom surface 3312 and two side curved surfaces 3313. A hole edge of the collecting opening 24 consists of a top edge 241, a bottom edge 242 and two side edges 243. The top edge 241 and the bottom edge 242 are straight edges.

Figure 4A:
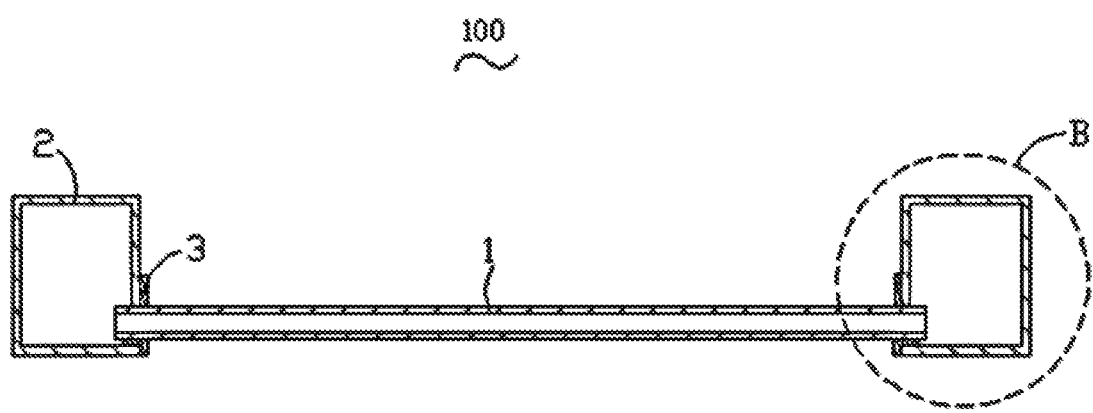
FIG. 4A shows a sectional view of a battery cooling assembly in accordance with another embodiment of the present disclosure.
Figure 4B:
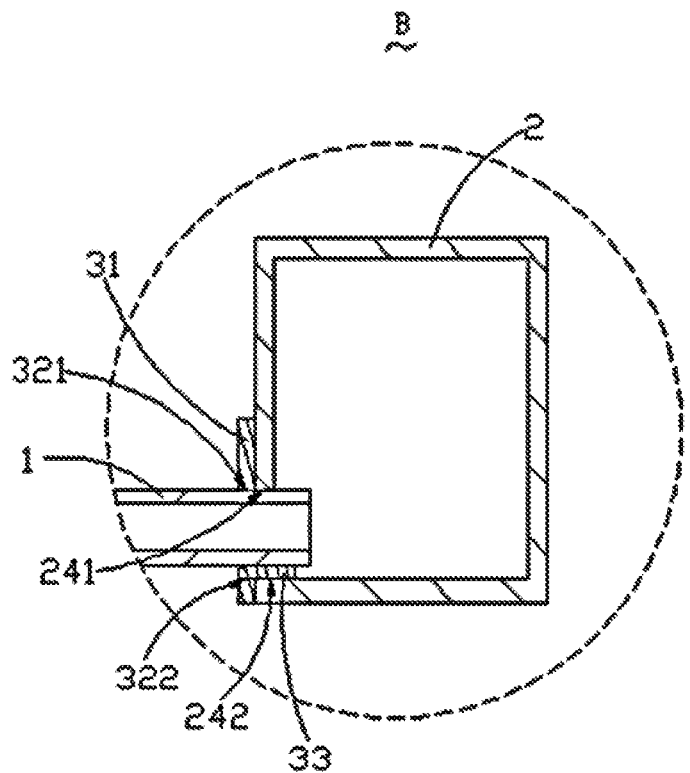
FIG. 4B shows an enlarged view of part B in FIG. 4A.
Figure 4C:
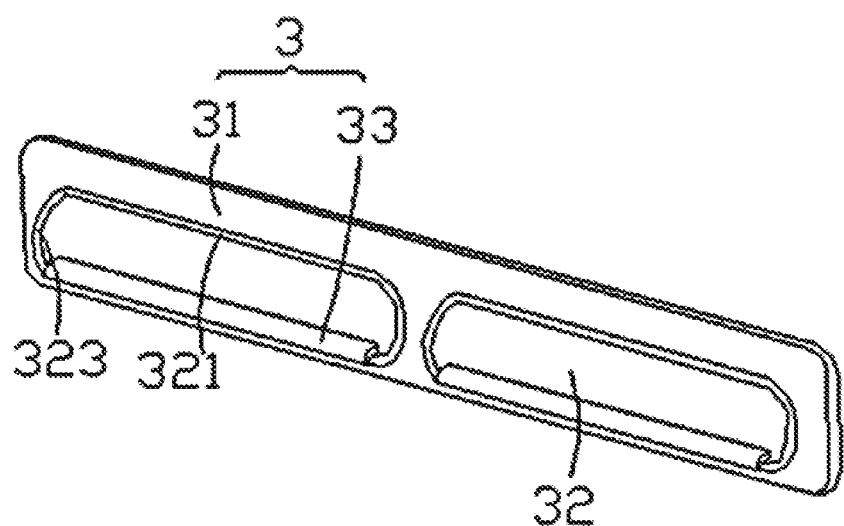
FIG. 4C shows a perspective view of a connecting aid.

As shown in FIG. 4A, FIG. 4B and FIG. 4C, as a second connection way between the extension 33 of the connecting aid 3 and the collecting opening 24 of the collecting tube 2, the hole edge of the collecting opening 24 consists of a top edge 241, a bottom edge 242 and two side edges 243. The hole wall of the through hole 32 consists of a top hole wall 321, a bottom hole wall 322 and two side hole walls 323. The extension 33 is formed by the bottom hole wall 322 extending outwardly, and the extension 33 abuts against the bottom edge 242 of the collecting opening 24. In this way, the bottom edge 242 of the collecting opening 24 can support the connecting aid 3, and the connection between the connecting aid 3 and the collecting tube 2 is more secured.

As shown in FIG. 2A and FIG. 2D, the collecting tube 2 consists of a top wall 21, a bottom wall 22 and two side walls 23, the collecting opening 24 is provided in one of the side walls 23, and a distance D1 between the top edge 241 of the collecting opening 24 and the top wall 21 is greater than a distance D2 between the bottom edge 242 of the collecting opening 24 and the bottom wall 22. Although the bottom edge 242 of the collecting opening 24 is too close to the bottom wall 22 of the collecting tube 2 that no flanging (the flanging is configured to connect an end of the cooling tube) may be formed at the bottom edge 242 of the collecting opening 24 by a punching process, the extension 33 of the connecting aid 3 can make up for the disadvantage of the process. Therefore, the collecting opening 24 may be opened by machining. It is unnecessary to place an opening mold in the collecting tube 2 and to provide the collecting opening 24 at a position close to the bottom wall 22, thereby reducing height of the cooling tube 1 as compared with the collecting tube 2.

Still referring to FIG. 2A and FIG. 2D, the bottom edge 242 of the collecting opening 24 is aligned with the inner surface of the bottom wall 22, that is, the distance D2 is zero. In this way, the extension 33 of the connecting aid 3 extends through the collecting opening 24 into the collecting tube 2, and connects with the inner surface (i.e., bottom surface of the collecting passage) of the bottom wall 22. In this way, the connection area between the connecting aid 3 and the collecting tube 2 is further increased and the connection strength between the two is enhanced.

The connecting aid 3, the collecting tube 2 and the cooling tube 1 may be connected by soldering, as described below.

As shown in FIG. 3A, FIG. 3B and FIG. 3C, the base plate 31 has two surfaces that are respectively a first surface 311 and a second surface 312, the extension 33 is formed on the second surface 312, and the second surface 312 of the base plate 31 is fixedly attached to the collecting tube 2, or the first surface 311 of the base plate 31 is fixedly attached to the collecting tube 2.

The base plate 31 is a metal sheet. The extension 33 is formed by punching the through hole 32 on the metal sheet using the punching process. The metal sheet includes a substrate layer whose two sides are respectively provided with a solder composite layer. The substrate layer is the main material of the metal sheet to ensure structure strength of the connecting aid 3 per se. For example, the substrate layer may be an aluminum sheet, and a solder composite layer provided on one surface of the aluminum sheet is a soldering flux layer to solder the connecting aid 3 and the collecting tube 2 together. A solder composite layer provided on the other surface of the aluminum sheet is a soldering flux layer to solder the connecting aid 3 and the cooling tube 1 together. A soldering flux layer may be an aluminum layer of low melting point. The aluminum sheet is formed into the extension 33 by a punching and flanging process. Although the thickness of the extension 33 is thinner as compared with the thickness of the aluminum sheet, which affecting the strength of the extension 33 per se, the connecting aid 3 is a joint part independent from the collecting tube 2. In other words, a thicker aluminum sheet may be used for the substrate layer to obtain a longer and thicker extension 33 by punching and stretching. In this way, the connection area between the connecting aid 3 and the cooling tube 1 is increased and the connection strength between the two is enhanced.

A particular assembly process of the battery cooling assembly 100 will be described in detail below.

That the collecting tube 2 is provided with a plurality of collecting openings 24 and is connected with a plurality of cooling tubes 1 in parallel is taken as an example. The battery cooling assembly 100 includes two collecting tubes 2, two connecting aids 3, and a plurality of cooling tubes 1. The number of collecting openings 24 in each collecting tube 2 is equal to the number of cooling tubes 1, and the number of the extensions 33 on each connecting aid 3 is equal to the number of cooling tubes 1. A solder composite layer is provided on a surface of the base plate 31 connected to the collecting tube 2, on the hole wall of the through hole 32 and on the inner peripheral wall 332 of the extension 33 (the extension is of a tubular shape). First of all, two connecting aids 3 are installed respectively on the two collecting tubes 2, and a surface on which provided the solder composite layer of the base plate 31 is placed close to the collecting tube 2. Then, two ends of each cooling tube 1 are respectively inserted into the through holes 32 of the two connecting aids 3, and the ends of the cooling tube 1 are brought into close contact with the inner peripheral wall 332 of the extension 33, so that the two collecting tubes 2 connect all the cooling tubes 1 in parallel. Finally, the assembled battery cooling assembly 100 is entirely placed in a brazing furnace, and soldering material melted from the solder composite layer is filled in a gap between the base plate 31 and the collecting tube 2, and is filled in a gap between the through hole 32 and an end of the cooling tube 1, and also is filled in a gap between the inner peripheral wall 332 of the extension 33 and an end of the cooling tube 1. After being cooled and solidified, the soldering material solders the cooling tube 1, the connecting aid 3 and the collecting tube 2 into a whole.

To sum up, the battery cooling assembly 100 of the present disclosure can increase the connection strength between the cooling tube 1 and the collecting tube 2, thereby reducing the risk of leakage of the cooling medium. Therefore, the battery cooling assembly 100 of the present disclosure effectively overcomes various shortcomings in the existing technology and has high industrial utilization value.

The above-described embodiments only describe principles and their advantages by examples, but are not intended to impose a limitation to the present disclosure. Any one skilled in the technique may modify or change the above-described embodiments without departing from the principles of the present disclosure. Therefore, any modification or change made by those with common knowledge in the art and that does not depart from the technical ideas of the present disclosure shall fall into the protection scope of the present disclosure.

What is claimed is:

1. A battery cooling assembly, comprising:
   a cooling tube;
   a collecting tube, comprising a top wall, a bottom wall, and two side walls, wherein:
      a collecting opening is provided in one of the two side walls;
      an opening edge of the collecting opening comprises a top edge, a bottom edge, and two side edges; and
      the bottom edge of the collecting opening is in contact with an inner surface of the bottom wall; and
   a connecting aid, comprising a base plate provided with a through hole, and a hole wall of the through hole extending outwardly to form an extension, wherein the extension abuts against the bottom edge of the collecting opening, and the extension is configured to:
      extend through the collecting opening beyond the one of the two side walls and into the collecting tube, and
      be in direct contact with the inner surface of the bottom wall;
   wherein an end of the cooling tube is connected to the extension through the through hole, the base plate is connected with the collecting tube, and the through hole is in communication with the collecting opening.

2. The battery cooling assembly according to claim 1, wherein the extension extends one-way along an axis of the through hole.

3. The battery cooling assembly according to claim 2, wherein the extension extends into the collecting opening.

4. The battery cooling assembly according to claim 3, wherein the extension has a tubular structure.

5. The battery cooling assembly according to claim 4, wherein a cross-sectional shape of the extension matches a shape of the collecting opening, and the extension extends through the collecting opening into a collecting passage of the collecting tube.

6. The battery cooling assembly according to claim 1, wherein:
   the hole wall of the through hole comprises a top hole wall, a bottom hole wall and two side hole walls; and
   the extension is formed through extension of the bottom hole wall.

7. The battery cooling assembly according to claim 6, wherein—a distance between the top edge of the collecting opening and the top wall is greater than a distance between the bottom edge of the collecting opening and the bottom wall.

8. The battery cooling assembly according to claim 1, wherein the base plate comprises a first surface and a second surface, the extension is formed on the second surface, and a chamfer is provided at a through hole of the first surface.

9. The battery cooling assembly according to claim 5, wherein the extension is formed when the through hole is punched on the base plate by a stamping process.

10. The battery cooling assembly according to claim 1, wherein the extension extends into the collecting opening.

11. The battery cooling assembly according to claim 1, wherein the extension has a tubular structure.

12. The battery cooling assembly according to claim 1, wherein a cross-sectional shape of the extension matches a shape of the collecting opening, and the extension extends through the collecting opening into a collecting passage of the collecting tube.

13. The battery cooling assembly according to claim 1, wherein the extension is formed when the through hole is punched on the base plate by a stamping process.

* * * * *